United States Patent [19]
Lesser et al.

[11] Patent Number: 6,082,779
[45] Date of Patent: Jul. 4, 2000

[54] RELEASABLE PLUG CONNECTOR WITH MOUNTING DISPLAY

[75] Inventors: Hans-Jürgen Lesser, Rheinfelden; Michael Trede, Rixheim, both of Germany

[73] Assignee: A. Raymond & Cie, France

[21] Appl. No.: 09/032,573

[22] Filed: Feb. 27, 1998

[30] Foreign Application Priority Data

Mar. 1, 1997 [DE] Germany ............................ 197 08 377

[51] Int. Cl.$^7$ .................................................. G05D 11/00
[52] U.S. Cl. .............................. 285/93; 285/319; 285/921
[58] Field of Search ............................... 285/93, 319, 921

[56] References Cited

U.S. PATENT DOCUMENTS

| | | | |
|---|---|---|---|
| 4,753,458 | 6/1988 | Case et al. ................................. | 285/93 |
| 4,895,396 | 1/1990 | Washizu ..................................... | 285/93 |
| 5,152,555 | 10/1992 | Szabo ........................................ | 285/93 |
| 5,374,088 | 12/1994 | Moretti et al. . | |

FOREIGN PATENT DOCUMENTS

| | | |
|---|---|---|
| 0 505 930 B1 | 3/1992 | European Pat. Off. . |
| 0 605 801 B1 | 12/1993 | European Pat. Off. . |
| 2216213 | 10/1989 | United Kingdom ...................... 285/93 |
| 4027077 | 11/1994 | WIPO ...................................... 285/93 |

Primary Examiner—Dave W. Arola
Attorney, Agent, or Firm—Gifford, Krass, Groh, Sprinkle, Anderson & Citkowski, P.C.

[57] ABSTRACT

A releasable connector for connecting tubing such as used in fuel lines has a display member to indicate when positive locking has occurred. The display member member is attached to the outside of the housing of the connector. The display member has a strap supporting a cover portion. The cover portion has a pair of resilient flanges which are insertable into an opening in the housing of the connector. The flanges extend into a chamber to engage an annular ring of a conventional male tube end. The annular portion of the tube end displaces the flanges of the display member after passing through a locking member contained in the housing of the connector. In this way, the tamper indicator indicates that the tube end has been positively received in the locking position.

6 Claims, 2 Drawing Sheets

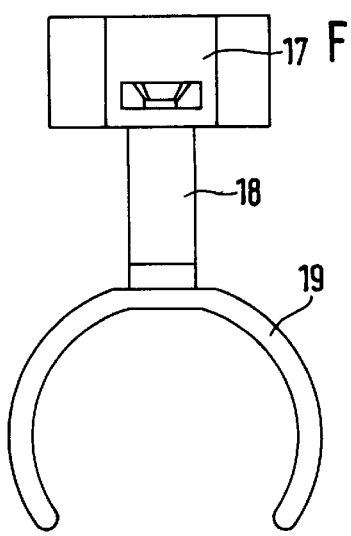
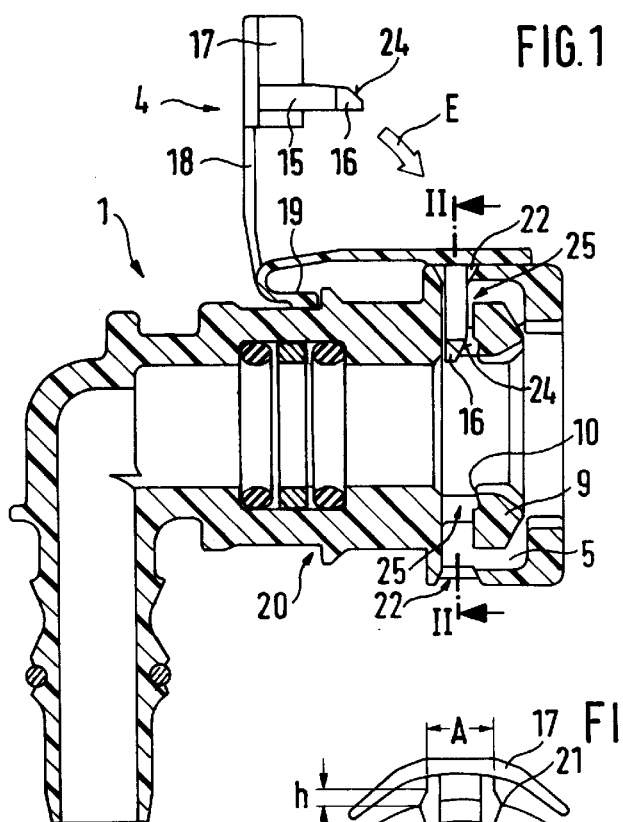
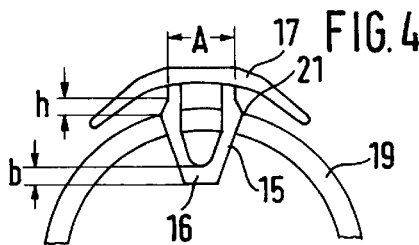
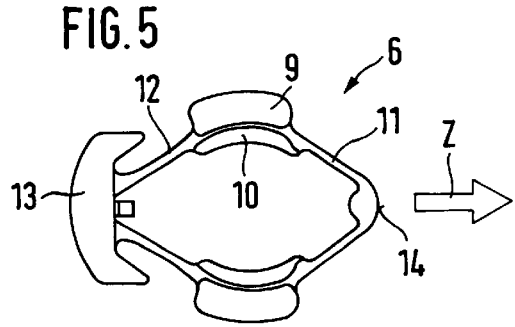
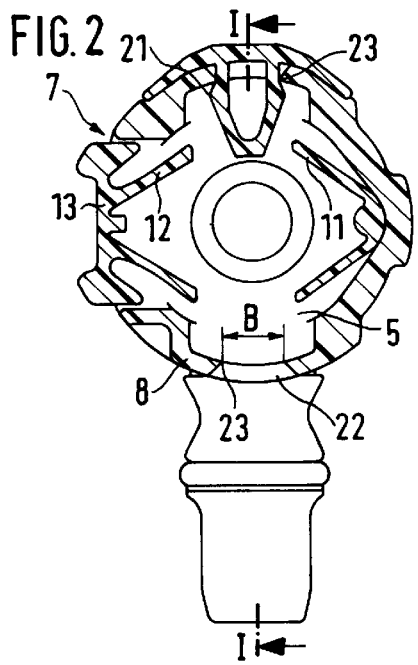
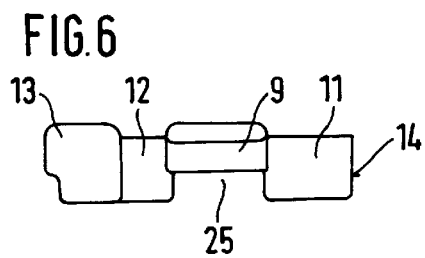

RELEASABLE PLUG CONNECTOR WITH MOUNTING DISPLAY

BACKGROUND OF THE INVENTION

The invention relates to a releasable plug connector having a mounting display for connecting lines or conduits carrying liquid and gaseous substances.

With a plug connector of this type, known from EP 0 505 930 B1, the display part consists of two flanges, which are parallel to each other and are molded onto the flag part in a fork-like manner. These flanges can be tangentially introduced into two opposite lateral slots of the housing wall. In the receiving area of the holding element, the flanges have two ears that protrude inwardly. During introduction of the insertion part, the ears are pushed away outwardly by the holding element. Furthermore, towards the fork element, each ear has one locking hook which in the inserted state of the display part is engaged with the end of the lateral slot. As soon as the fork-like flanges are pressed apart by the holding element, the locking hooks also disengage from the longitudinal slots and the display part may be pulled out at the outwardly protruding flag, providing proof of the mounting.

With this display part, it is a disadvantage that the outwardly protruding flag, prior to and after the mounting, consistently has the same position. Only by pulling on the flag can it be determined whether the display part can be released, indicating that the holding element of the insertion part is locked in at the lock edges of the holding part.

It is an object of the invention to construct a display part in such a way that with a correct mounting of the plug connector, an indication of completion takes place automatically without the operator having to carry out any additional step.

In accordance with the present invention, this object is produced by a display portion which consists of flanges which are positioned in the radial plane in a v-shaped manner and that can be pressed together in a resilient manner. These flanges are locked in a pressed-in position of the display part, in a snap button-like manner. Outwardly protruding projections engage the opening of the housing wall. The flanges are connected at the ends protruding from the opening, with a resilient cover plate constructed at its opposite end in an anchorable manner at the housing wall. In a simple process, the display member following its displacement by the holding element of the insertion part, protrudes radially out of the receiving chamber to provide visible proof for a correct mounting to the person carrying out the mounting operation, as well as to subsequent inspectors.

For the purpose of anchoring the display member to the connector housing, a clamp strap is formed at the free end which can be inserted into a correspondingly encircling groove on the housing wall. For this purpose, in accordance with the invention, the cover plate is aligned with respect to the clamp strap in such a way that it protrudes radially with the display part in a nontensioned position in an outward direction and, in the pressed-in position exerts a radially outwardly directed force on the display part.

In order to further support the tripping of the display member, the display member may, in accordance with an additional characteristic of the invention, be supported on both sides of the opening with flanges resting in a resilient manner on the housing wall. A snap button-like locking effect can be affected in a particularly simple manner by the construction of the display part in this manner.

BRIEF DESCRIPTION OF THE DRAWING

In the drawing, a preferred example of the invention is shown, which is to be explained in greater detail in the following text, wherein:

FIG. 1 shows a plug connector housing with a mounted display member in cross section along lines I—I of FIG. 2;

FIG. 2 shows a cross section through the housing in accordance with line II—II in FIG. 1 with a locked display member;

FIG. 3 shows the display member in accordance with the invention in the nontensioned position;

FIG. 4 shows a partial view of the display member in accordance with FIG. 3 while in the tensioned position in the mounting position above the opening of the plug housing prior to locking;

FIG. 5 shows a holding member in a plane view in the mounting position prior to the introduction into the recess of the housing wall;

FIG. 6 shows the same holding element in a side view;

DETAILED DESCRIPTION OF THE PREFERRED EMBODIMENT

The plug connector shown in the figures provides a releasable connection of pipes and tubing and, in particular, of fuel line conduits in motor vehicle construction. The plug connector consists here of a cylindrical connector housing (1), a tubular insertion member (2) with an encircling holding portion (3), as well as a display member (4) that can be connected with the connector housing (1).

Figure 8:
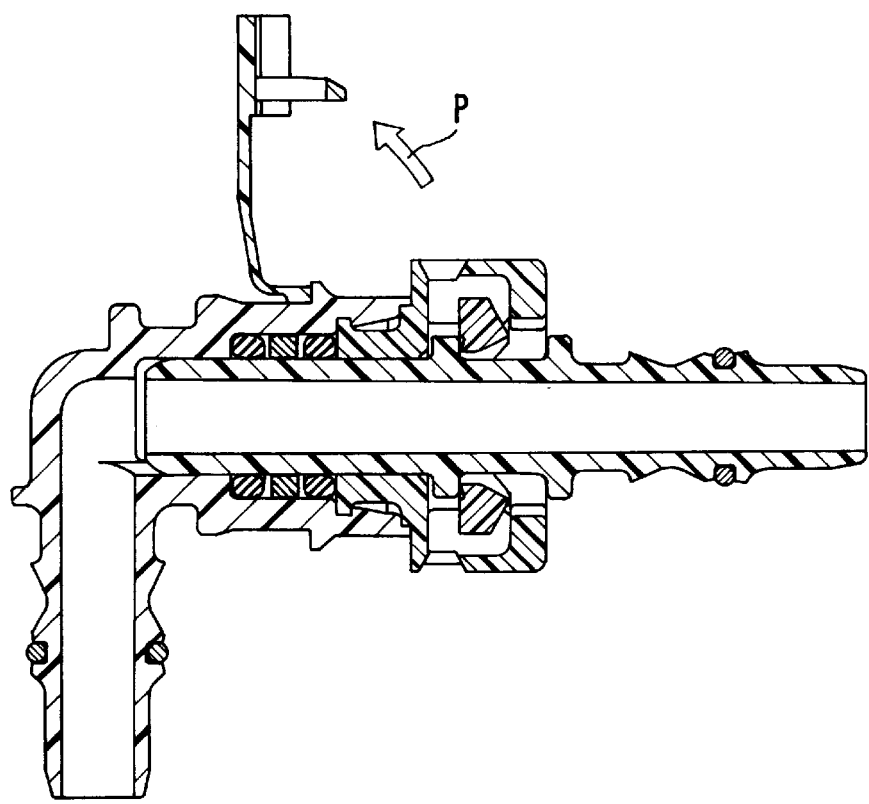
FIG. 8 shows the same mounting situation after locking of the holding element with a display indicating the correct mounting.

The connector housing (1) has in its insertion area a receiving chamber (5) for a separate holding locking member or element (6) that is inserted from the outside radially to the housing axis through an appropriate recess (7) in the housing wall (8) in the direction of the arrow (Z). This holding element (6) has, as can be seen from FIGS. 5 and 6, support portions (9) with radially inwardly directed lock edges (10) that grip behind the holding portion (3), after the insert member (2) has been pressed into the connector housing (1) to hold it in the closed position as shown in FIG. 8.

The support portions (9) are connected together on one side via spring flanges (11), formed in a v-shape and a rounded off connection point (14); on the other side, they are connected via spring flanges (12) in a v-shaped configuration to a pressure plate (13).

When the holding element (6) is installed, the two spring flanges (11) and the rounded off connection point (14) are supported at the inside of the housing wall (8) in a corresponding depression, while the pressure plate (13) somewhat protrudes from the housing wall (8). In order to release the plug connection, the pressure plate (13) is pressed into the housing wall (8). The support elements (9) with the lock edges (10) are then moved outwardly by means of the spring flanges (11 and 12) to release the holding portion (3), so that the insert member (2) can be pulled out without effort. This closing and release mechanism is described in detail in EP 0 605 801 C1.

The display member (4), shown in FIGS. 1, 3, and 4, consists of two flanges (15), gathered into a v-shaped configuration and compressible in a resilient manner, which are molded onto the underside of a roof-like support flange (17) and are connected by means of a crosspiece (16) at the opposite ends. The support flange (17) is connected centrally by a flap portion (18) to a clamp strap (19) is formed. The clamp strap (19) has an inner diameter and width such that it can be inserted into a correspondingly encircling groove (20) in the housing wall (8) and can be anchored there.

The indicator display member (4) is anchored on the housing wall (8) in such a way that the flap (18) with the support flange (17) protrudes radially outwardly in a non-tensioned position. After pivoting the display member (4) in the direction of the arrow (E), a radially outwardly directed pulling force (P) is produced in opposition to the bending stress placed on the flap. For this purpose, the flanges (15) have, as can be seen from FIGS. 2 and 4, projections (21) protruding outwardly and that can be locked in the opening (22) of the housing wall (8) when the display portion (4) is pressed in.

From the direction of insertion of the insertion member (2), the opening (22) is located behind the lock edges (10) of the housing element (6). As can be clearly seen in FIG. 2 in the lower area of the housing wall (8) near the opening (22), the opening 22 has a width (B) that corresponds to the outer distance (A) of the two spring flanges (15) just below the support flange (17).

The support portions (9) of the holding elements (6) have, at the place corresponding to the opening (22), a recess (25) corresponding to the width and thickness of the spring flanges (15). Thus, the spring flanges (15) can be pushed in the direction of insertion behind the support portions (9) into the receiving area of the holding portion (3).

The spring flanges (15) extend from the underside of the support flange (17), a length corresponding to the wall thickness of the housing wall (8), approximately parallel to each other. From there the spring flanges expand conically to the projections (21) to narrow together again in a v-shaped configuration to the crosspiece (16). The crosspiece (16) has an inclined surface (24) in the direction of insertion of the insertion part (2), corresponding to the radial width of the holding portion and wherein the height (h) of the conical expansion to the projection (21) corresponds to the radial extension (b) of the inclined surface (24).

Figure 7:
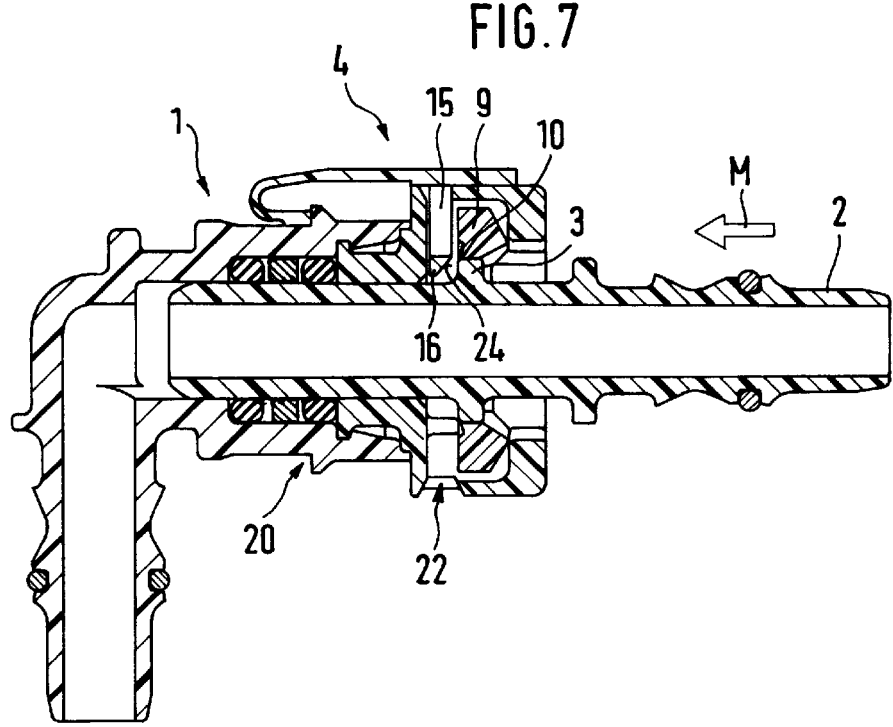
FIG. 7 shows a plug connector housing with a mounted display member during the introduction of an insert member prior to the locking of the holding element.

As can be seen in FIG. 7, the insertion member (2) is pressed into the plug connector housing (1) in the direction of the arrow (M), while the lock edges (10) of the holding element (6) are pressed apart. During further penetration of the insertion member (2), the holding portion (3) then pushes against the angled surface (24) of the crosspiece (16) and, through the radially effective force component, pushes the crosspiece together with the display member (4) towards the outside. At that time, the spring flanges (15) are pushed together in an elastic manner through the opening (22) until the projections (21) have passed through the inner edge (23) of the opening. Subsequently, the support flange (17) along with the spring flanges (15) due to the pulling force (P) freed by the pre-tensioned cover plates (18), are forced outwardly. At this point, the support flange (17) visibly lifts, in the manner of a flag, from the plug connector housing (1) and thereby indicates that the insertion member (2) is correctly mounted (FIG. 8).

We claim:

1. A connector for releasably coupling a tubular insertion member having an annular holding portion, said connector and said insertion member delivering fluid from one fluid line to another fluid line when coupled, said connector comprising:

a housing having a wall with an opening therethrough, said wall defining a chamber and having an opening at one end for receiving said insertion member into said chamber;

a locking member mounted in said chamber having at least one locking edge for engaging said holding portion of said insertion member to lock said insertion member in said housing;

a display member having a flap portion extending between a clamp portion and a cover portion, said clamp portion adapted to engage an outer surface of said housing, said cover portion having a pair of resilient flange portions removably mounted to said housing, said flange portions extending radially through said opening in said housing wall to extend into said chamber downstream of said locking member to engage said wall when said cover portion is in an insertion position adjacent said housing, said pair of flanges being deformed by said holding portion of said insertion member to disengage said pair of flanges from said wall after said holding portion has passed downstream of said locking member within said chamber during insertion, said flap portion biasing said cover portion to a display position spaced outwardly from said housing after disengagement of said flanges to indicate locking of said insertion member in said housing by engagement of said locking member with said holding portion.

2. The connector of claim 1, wherein each of said pair of flange portions further comprise a projection for engaging the wall portion of said connector forming said opening when said display member is in said insertion position.

3. The connector of claim 1, wherein said display member further comprises a crosspiece extending between said pair of flanges, said crosspiece having an angled surface for engaging said holding portion of said insertion tube.

4. A releasable connector for connecting a pair of fluid lines, one of said pair of fluid lines having an insertion portion having an annular holding portion, said releasable connector comprising:

a cylindrical housing mounted to an other of one of the pair of fluid lines, the housing having a wall defining a chamber for receiving the insertion portion of the one of the fluid lines, a holding element having at least one radially inwardly directed lock edge for gripping the holding portion of the one fluid line, the housing having an opening formed in the wall;

a display member mounted to the housing having a cover plate and an insertion portion, the insertion portion having a pair of flanges angled inwardly in a V-shape from the cover plate to a crosspiece, the insertion portion being removably mounted in the opening in the wall, the insertion portion extending radially inwardly downstream of the holding element, each of the pair of flanges having a shoulder for engaging the wall around said opening of said housing, the flanges deformable when contacted by the holding portion of the one fluid line to move the shoulders inwardly toward each other to release the insertion portion from the opening and move the cover plate to a position spaced apart from the housing.

5. A releasable plug connection, in accordance with claim 4 comprising a clamp strap (19) formed to extend from the cover plate and mounted in an encircling groove (20) in the housing wall (8).

6. A releasable plug connection, in accordance with claim 4, characterized in that the shoulder of each of the pair of flanges has an inclined portion which extends at a height (h) which is equal to a radial width of the crosspiece.

* * * * *